United States Patent
Sawada et al.

(10) Patent No.: US 8,520,270 B2
(45) Date of Patent: Aug. 27, 2013

(54) IMAGE READER, LIGHT GUIDE USED FOR THE SAME, AND METHOD OF MAKING LIGHT GUIDE

(75) Inventors: Hideki Sawada, Kyoto (JP); Yasuhiro Nagao, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 4 days.

(21) Appl. No.: 13/396,120

(22) Filed: Feb. 14, 2012

(65) Prior Publication Data

US 2012/0140296 A1 Jun. 7, 2012

Related U.S. Application Data

(63) Continuation of application No. 12/317,358, filed on Dec. 22, 2008, now Pat. No. 8,130,426.

(30) Foreign Application Priority Data

Dec. 21, 2007 (JP) .................. 2007-330080
Mar. 10, 2008 (JP) .................. 2008-59448
Apr. 7, 2008 (JP) .................. 2008-98998
Jun. 11, 2008 (JP) .................. 2008-152432

(51) Int. Cl.
*H04N 1/04* (2006.01)
*H04N 1/46* (2006.01)

(52) U.S. Cl.
USPC ........... 358/474; 358/484; 358/483; 358/482; 358/475; 358/509; 358/505

(58) Field of Classification Search
USPC .............. 358/484, 483, 482, 475, 509, 474, 358/505; 250/208.1, 216, 219, 234–236, 250/239, 227.11; 355/67–71; 399/220, 221; 359/516

See application file for complete search history.

(56) References Cited

U.S. PATENT DOCUMENTS

| | | | |
|---|---|---|---|
| 5,363,294 A * | 11/1994 | Yamamoto et al. | 362/330 |
| 6,184,513 B1 | 2/2001 | Sawada | |
| 6,206,535 B1 * | 3/2001 | Hattori et al. | 362/616 |
| 6,317,155 B1 * | 11/2001 | Ohyama | 348/373 |
| 6,724,503 B1 | 4/2004 | Sako et al. | |
| 7,226,197 B2 * | 6/2007 | Hayashi et al. | 362/608 |
| 7,248,764 B2 * | 7/2007 | Park et al. | 385/36 |
| 7,333,249 B2 | 2/2008 | Sawada | |
| 7,995,252 B2 * | 8/2011 | Okamoto et al. | 358/487 |
| 8,130,426 B2 * | 3/2012 | Sawada et al. | 358/484 |
| 2006/0050390 A1 * | 3/2006 | Sawada | 359/519 |
| 2009/0057541 A1 * | 3/2009 | Shoji et al. | 250/227.11 |
| 2010/0002461 A1 | 1/2010 | Wu et al. | |

FOREIGN PATENT DOCUMENTS

| | | |
|---|---|---|
| JP | 2-226626 | 9/1990 |
| JP | 3-62772 | 3/1991 |
| JP | 2004-266313 | 9/2004 |

* cited by examiner

*Primary Examiner* — Cheukfan Lee
(74) *Attorney, Agent, or Firm* — Hamre, Schumann, Mueller & Larson, P.C.

(57) ABSTRACT

An elongate light guide includes a light incident portion provided at an end in the longitudinal direction of the guide, a light reflecting portion extending in the longitudinal direction, a light emitting portion extending in the longitudinal direction for emitting linear light, and a scatterer for scattering the light entering through the light incident portion. For instance, the scatterer is provided as a grained portion formed at least part of the reflecting portion.

6 Claims, 15 Drawing Sheets

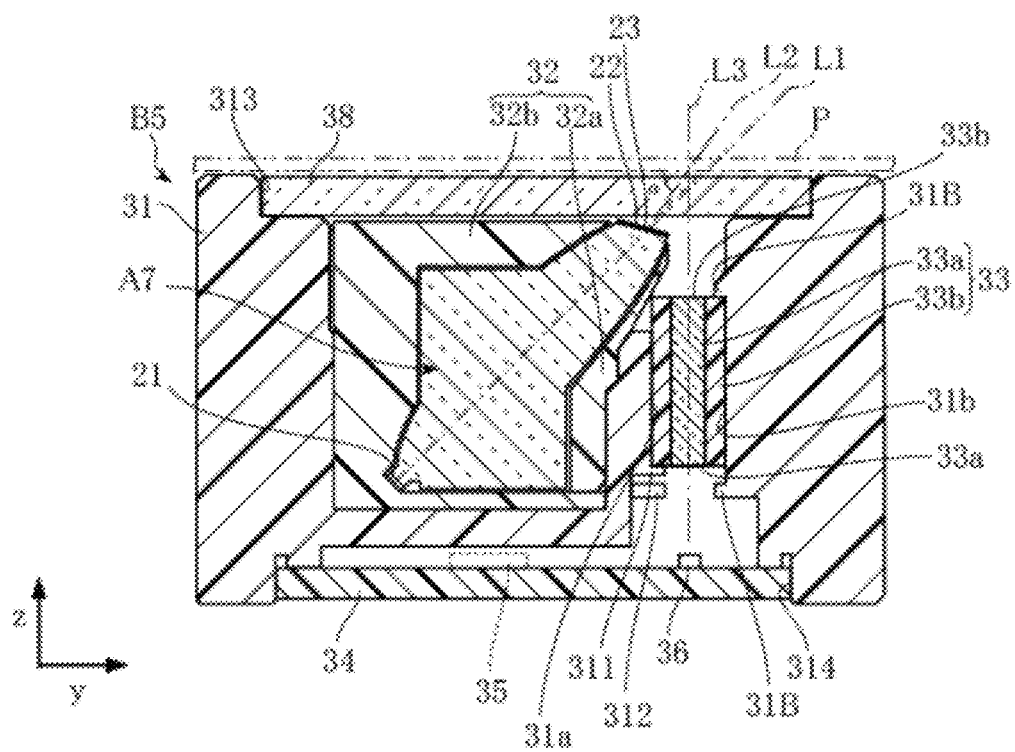

IMAGE READER, LIGHT GUIDE USED FOR THE SAME, AND METHOD OF MAKING LIGHT GUIDE

CROSS REFERENCE TO RELATED APPLICATIONS

This application is a Continuation of U.S. Ser. No. 12/317,358 filed Dec. 22, 2008, which is incorporated herein by reference.

BACKGROUND OF THE INVENTION

1. Field of the Invention

The present invention relates to an image reader and a light guide used for an image reader. The present invention further relates to a method of making a light guide.

2. Description of the Related Art

An example of conventional image reader is disclosed in JP-A-2004-266313. The conventional image reader is designed to obtain proper image data by enhancing the irradiation efficiency in irradiating an object to be read with linear light.

Examples of object to be read include securities such as a check and bills as well as documents printed on general-purpose recording sheets. Bills may have a wrinkle or a crease on the surface. In reading the image of such a bill using the conventional image reader, a shade may be formed on the surface of the bill irradiated with linear light. This shade appears as a dark portion in the image obtained, which is not desirable. Thus, to solve this problem and achieve proper image reading, the conventional image reader still has room for improvement.

Further, for a conventional image reader, improvement in a light guide to enable uniform linear light emission is demanded. Moreover, to prevent the deterioration of resolution due to out-of-focus, a structure which enables precise and easy fixing of an optical part such as a lens unit to a predetermined position is demanded.

SUMMARY OF THE INVENTION

The present invention has been proposed under the circumstances described above. It is, therefore, an object of the present invention to provide an image reader which is capable of reading images properly. Particularly, the present invention aims to provide a light guide suitable for such an image reader and a method of making the light guide.

According to a first aspect of the present invention, an elongate light guide is provided. The light guide comprises a light incident portion provided at an end in a longitudinal direction, a light reflecting portion extending in the longitudinal direction, a light emitting portion extending in the longitudinal direction for emitting linear light, and a scatterer for scattering light entering through the light incident portion.

Preferably, the scatterer comprises a grained portion formed at least part of the reflecting portion.

Preferably, the light reflecting portion includes a plurality of recesses arranged in the longitudinal direction.

Preferably, the scatterer is provided at the light emitting portion to scatter and pass the light traveling from the light reflecting portion.

Preferably, the scatterer comprises surface irregularities provided at the light emitting portion.

Preferably, the scatterer comprises a scattering sheet bonded to the light emitting portion.

According to a second aspect of the present invention, a method of making an elongate light guide is provided. The method comprises the steps of preparing a light guide body including a light incident portion provided at an end in the longitudinal direction, a light reflecting portion extending in the longitudinal direction, a light emitting portion extending in the longitudinal direction for emitting linear light, and graining at least part of the light reflecting portion.

According to a third aspect of the present invention, an image reader is provided. The image reader comprises a case, a light guide accommodated in the case for emitting linear light toward an object to be read, a light receiver arranged in the case along a primary scanning direction, a lens unit accommodated in the case for converging light reflected by the object onto the light receiver and including a light emitting end surface facing the light receiver and a light incident end surface opposite from the light emitting end surface, a lens holding portion for elastically holding the light emitting end surface of the lens unit from a first side, a lens stopping portion provided at a different height from the lens holding portion to stop the light emitting end surface from a second side opposite from the lens holding portion, and a lens engaging portion for elastically engaging with the light incident end surface from the second side.

Preferably, the lens holding portion and the lens engaging portion comprise an elastically deformable projection.

Preferably, the image reader according to the third aspect further comprises a transparent cover provided at an upper portion of the case to face the light incident surface. The lens unit is held by the lens holding portion and the lens engaging portion to be located at the middle position between the transparent cover and the light receiver.

According to a fourth aspect of the present invention, an image reader is provided. The image reader comprises a case, a light guide accommodated in the case and including a light emitting portion for emitting linear light toward an object to be read, a light receiver arranged in the case along a primary scanning direction, and a lens unit accommodated in the case for converging the light reflected by the object onto the light receiver. The linear light emitted from the light emitting portion and the object form an angle of not less than 50°.

Preferably, the lens unit includes a lens member and a lens holder holding the lens member by sandwiching the lens member in a secondary scanning direction. An end of the light emitting portion on the lens unit side is positioned between an end of the lens holder on the light guide side and an end of the lens member on the light guide side.

Preferably, the light guide includes a light reflecting portion provided on an opposite side of the light emitting surface. The angle of inclination of the light emitting surface with respect to the object to be read is smaller than the angle of inclination of the light reflecting portion with respect to the object.

Other features and advantages of the present invention will become more apparent from the detailed description given below with reference to the accompanying drawings.

BRIEF DESCRIPTION OF THE DRAWINGS

FIG. 22 is a sectional view showing a fifth embodiment of the image reader according to the present invention.

FIG. 23 is a sectional view showing the light guide of the image reader of FIG. 22.

DETAILED DESCRIPTION OF THE PREFERRED EMBODIMENTS

Preferred embodiments of the present invention will be described below with reference to the accompanying drawings.

Figure 1:
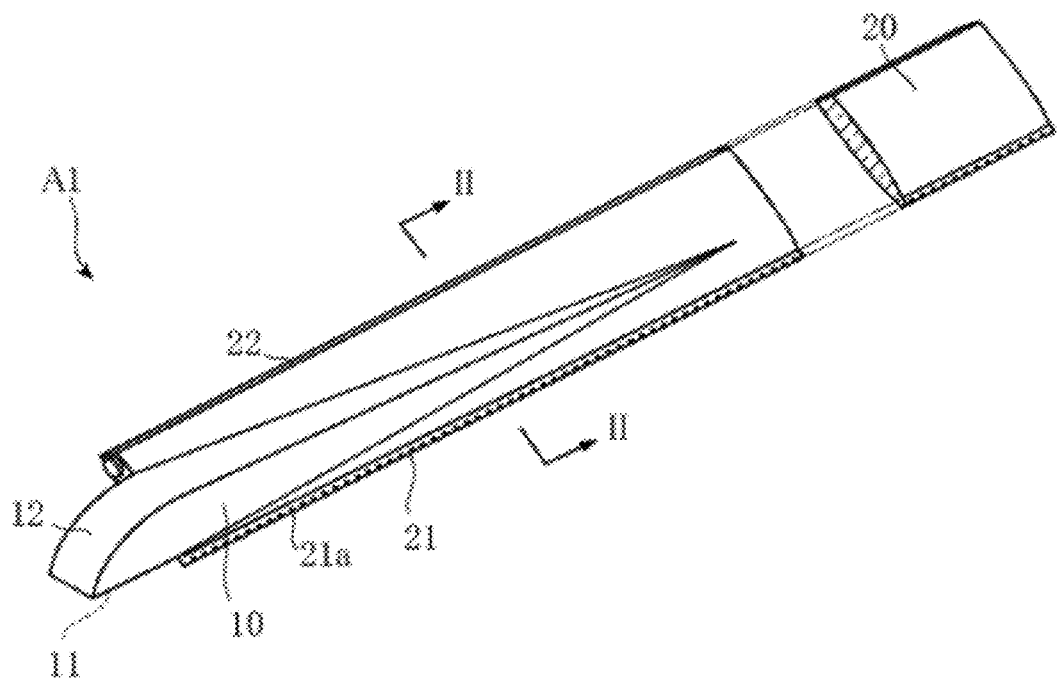
FIG. 1 is a perspective view showing a first embodiment of the light guide according to the present invention.
Figure 2:
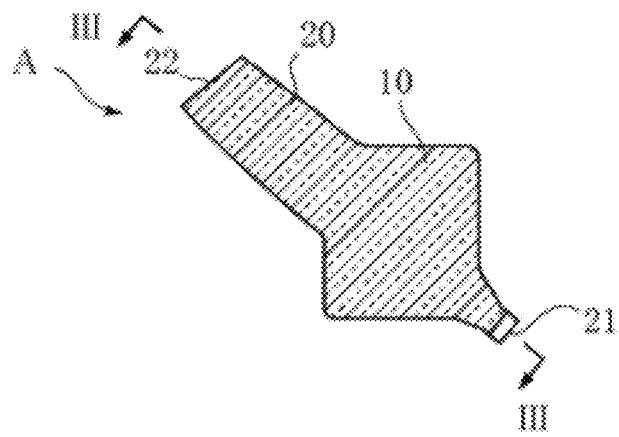
FIG. 2 is a sectional view taken along lines II-II in FIG. 1.
Figure 3:
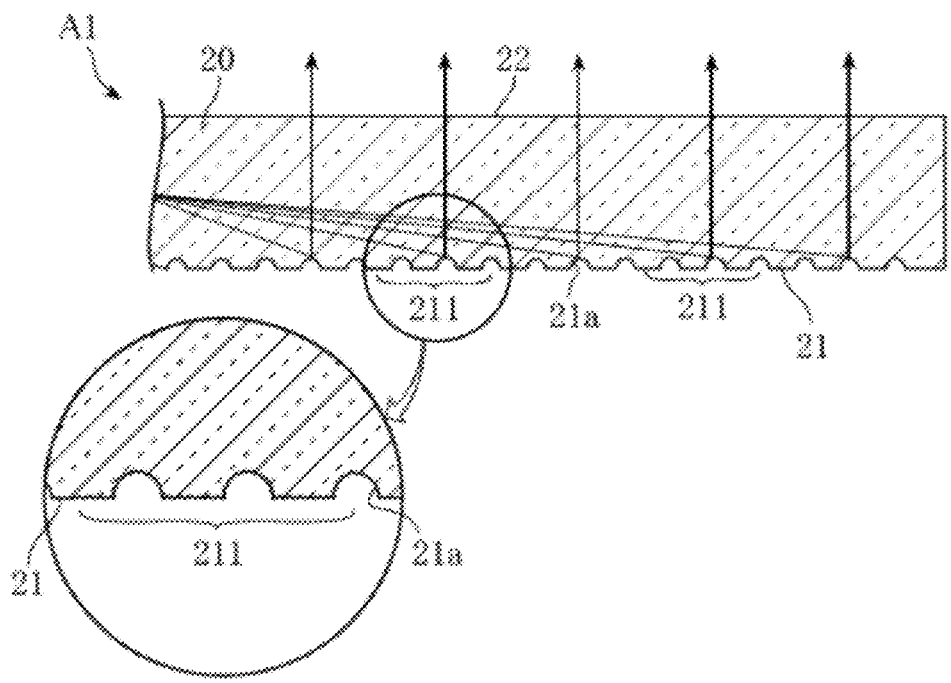
FIG. 3 is a sectional view taken along lines in FIG. 2.
Figure 4:
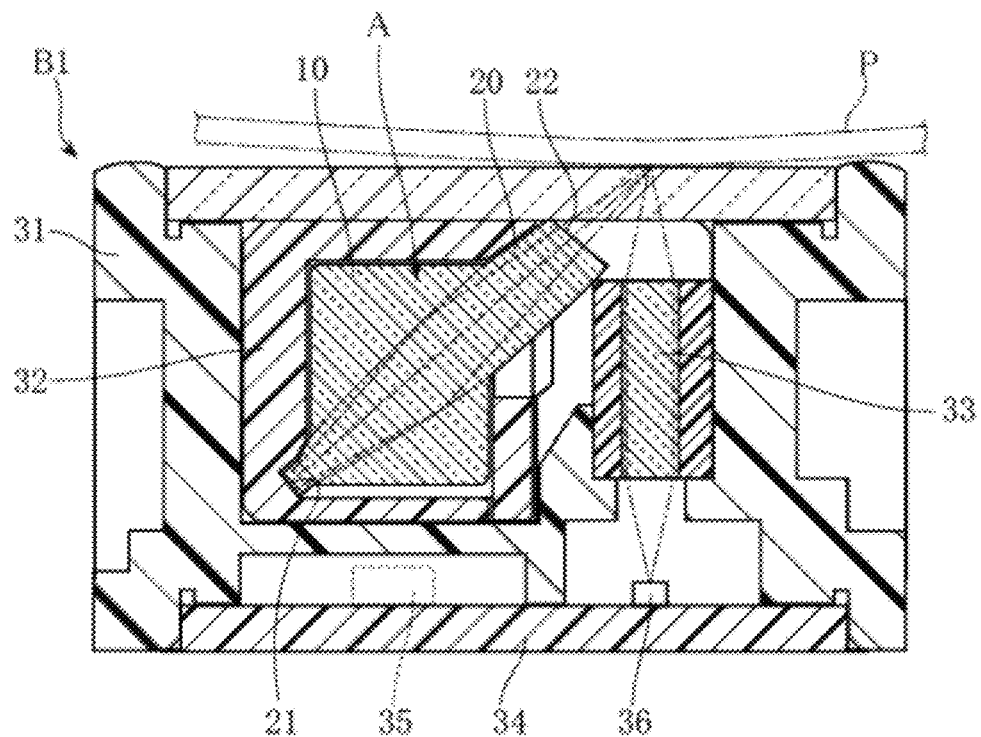
FIG. 4 is a sectional view showing a first embodiment of the image reader according to the present invention.

FIGS. 1-3 show an example of light guide according to the present invention. FIG. 4 is a sectional view showing a first embodiment of the image reader according to the present invention, which incorporates the light guide A1 shown in FIGS. 1-3. The image reader B1 shown in FIG. 4 includes the light guide A1, a case 31, a reflector 32, a lens unit 33, a substrate 34, an LED module 35 and a light receiver 36.

The light guide A1 is made of a transparent resin such as methyl methacrylate resin (PMMA). In the image reader B1, the light guide causes the light from the LED module 35 to be emitted toward an object P to be read as linear light extending in the primary scanning direction. The light guide A1 is in the form of a bar elongated in the primary scanning direction of the image reader B1. As shown in FIG. 1, the light guide A1 is made up of a pyramidal portion 10 and a flat portion 20 and includes a light incident portion 11, an inclined surface 12, a light reflecting portion 21 and a light emitting portion 22. The light incident portion 11 and the inclined surface 12 are arranged at an end of the light guide A1 in the longitudinal direction.

In the image reader B1, the light incident portion 11 faces the LED module 35 on the substrate 34. The inclined surface 12 reflects the light entering the light guide through the light incident portion 11 to cause the light to travel in the longitudinal direction. The light reflecting portion 21 is provided at an end of the flat portion 20 in the emission direction of the linear light, whereas the light emitting portion 22 is provided at the other end of the flat portion 20 in the emission direction of the linear light. In this embodiment, as shown in FIG. 2, the pyramidal portion 10 and the flat portion 20 are so arranged that the respective center lines form an angle of about 40°.

As shown in FIG. 3, the light reflecting portion 21 includes a plurality of recesses 21a spaced from each other in the longitudinal direction. The light reflecting portion 21 is further formed with a plurality of grained portions 211 each having a predetermined length in the longitudinal direction. The grained portions 211 constitute the scatterer of the present invention and include grains formed by e.g. blasting using beads of 50 to 150 µm. Since the grained portions 211 include projections and recesses of the grains, a larger amount of light is reflected at the grained portions as compared with the state before the grains are formed. In the light guide A1, by the provision of the grained portions 211, the amount of light to be emitted from the light emitting portion 22 is increased partially.

The case 31 accommodates the light guide A1, the reflector 32, the lens unit 33, the substrate 34, the LED module 35 and the light receiver 36 and is generally in the form of a rectangular parallelepiped extending in the primary scanning direction. For instance, the case 31 is made of a black resin.

The reflector 32 prevents the light traveling within the light guide A1 from leaking and is made of e.g. white resin. As shown in FIG. 4, the reflector 32 is incorporated in the case 1 and surrounds the light guide A1.

The lens unit 33 is an optical part for converging the linear light reflected by the object P onto the light receiver 36. For instance, the lens unit 33 includes a plurality of columnar lenses arranged in the primary scanning direction and held by a housing made of a resin.

The substrate 34 is made of e.g. a ceramic material or a glass fiber-reinforced epoxy resin. The LED module 35 and the light receiver 36 are mounted on the substrate. As shown in FIG. 4, the substrate 34 is fitted to the bottom of the case 31.

The LED module 35 is the light source of the image reader B1 and incorporates e.g. LED chips for emitting red light, blue light and green light. The LED module 35 is mounted on the substrate 34 to face the light incident portion 11.

The light receiver 36 is arranged to extend in the primary scanning direction and designed to generate an electromotive force corresponding to the amount of light received and output a luminance signal for each pixel from the electromotive force. The light reflected by the object P is received after passing through the unit 33, whereby the content of the object P is read as image data.

A method of making the light guide A1 will be described below.

First, to make a light guide A1, methyl methacrylate resin in a liquid state is injected into a mold prepared in advance. The resin is solidified and then taken out of the mold. In this step, use is made of a mold formed with a plurality of projections for forming recesses 21a at the light reflecting portion 21.

Then, the regions at which grained portions 211 are to be formed are determined. Specifically, in this step, light is caused to enter through the light incident portion 11, and the light amount distribution of the linear light emitted from the light emitting portion 22 in the longitudinal direction is measured. Based on the measurements, from the light reflecting portion 21, the regions at which the amount of light reflected is relatively small are found. These regions are determined as regions to be made grained portions 211.

Then, graining is performed with respect to the regions determined in the above step. For instance, the graining is performed by blasting using glass beads of 50 to 150 μm. At the grained portions 11 thus formed by blasting, the amount of light reflection is larger than that before the blasting. In this way, the amount of light reflection is generally equalized throughout the length of the light reflecting portion 21, and the linear light emitted from the light emitting portion 22 becomes substantially uniform in the longitudinal direction.

Then, the grained portions 211 are improved. Specifically, in this step, blasting is further performed with respect to parts of the grained portions 211 at which the amount of light reflected is relatively small, so that the grains at these parts become deeper. As the grains become deeper, the amount of light reflected increases. Thus, the amount of light reflected at these parts increases, whereby the uniformity of the linear light further enhances. By repeating this step, a light guide A1 which is capable of emitting uniform linear light is obtained.

The advantages of the light guide A1 will be described below.

According to this embodiment, the grained portions 211 are formed at the regions of the light reflecting portion 21 at which the amount of light reflected is relatively small. Thus, the light guide A1 emits linear light which is uniform in the longitudinal direction. Moreover, in this embodiment, the work to improve the grained portions 211 is further performed to make the light reflected at the grained portions 211 further uniform in the longitudinal direction. This work enhances the uniformity of the linear light emitted from the light guide A1. The image reader B1, which incorporates the light guide A1 capable of emitting uniform linear light, reads the object P properly.

According to this embodiment, a mold does not need to be modified to make the light guide A1. Thus, the light guide A1, which is capable of emitting uniform linear light, is made relatively easily. The repetitive adjustment to make the linear light more uniform is easily performed by repeating the blasting.

Since the light reflecting portion 21 in this embodiment is formed with a plurality of recesses 21a, a large amount of light is reflected by the light reflecting portion 21 toward the light emitting portion 22. As a result the light guide A1 emits relatively bright linear light. Even when the recesses 21a are not formed, a light guide which emits uniform linear light can be obtained by forming grained portions 211 at regions at which the amount of light reflected is small and by further adjusting the depth of the grains.

Figure 5:
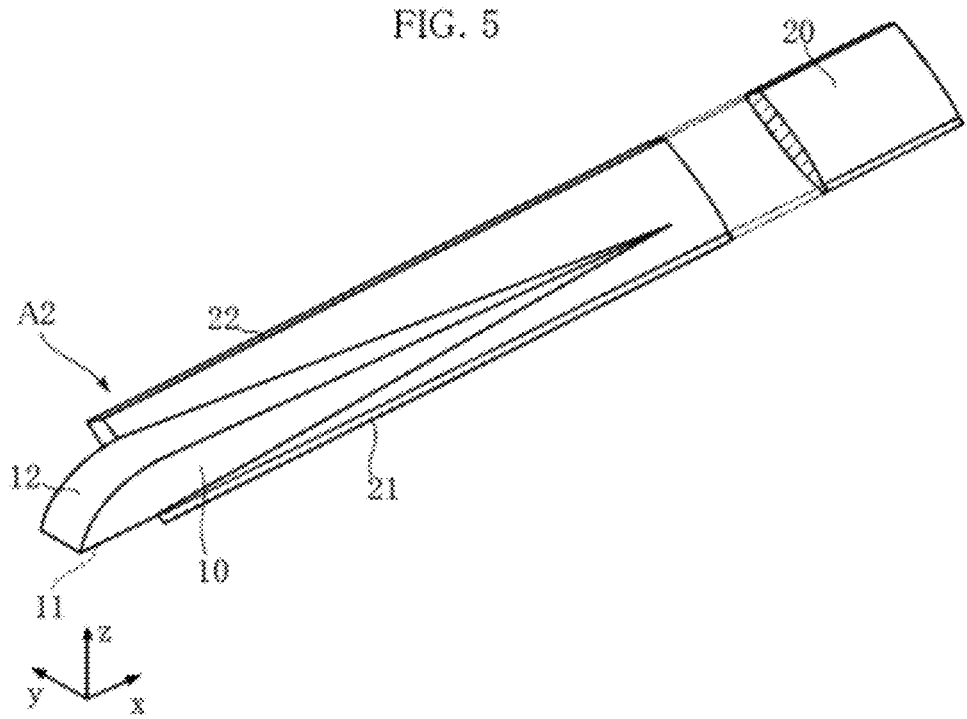
FIG. 5 is a perspective view showing a second embodiment of the light guide according to the present invention.
Figure 6:
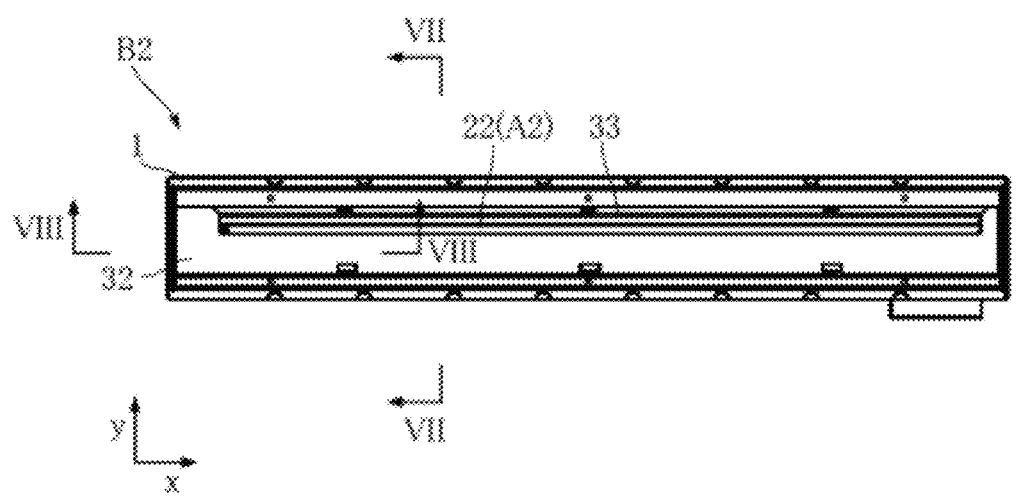
FIG. 6 is a sectional view showing a second embodiment of the image reader according to the present invention.
Figure 7:
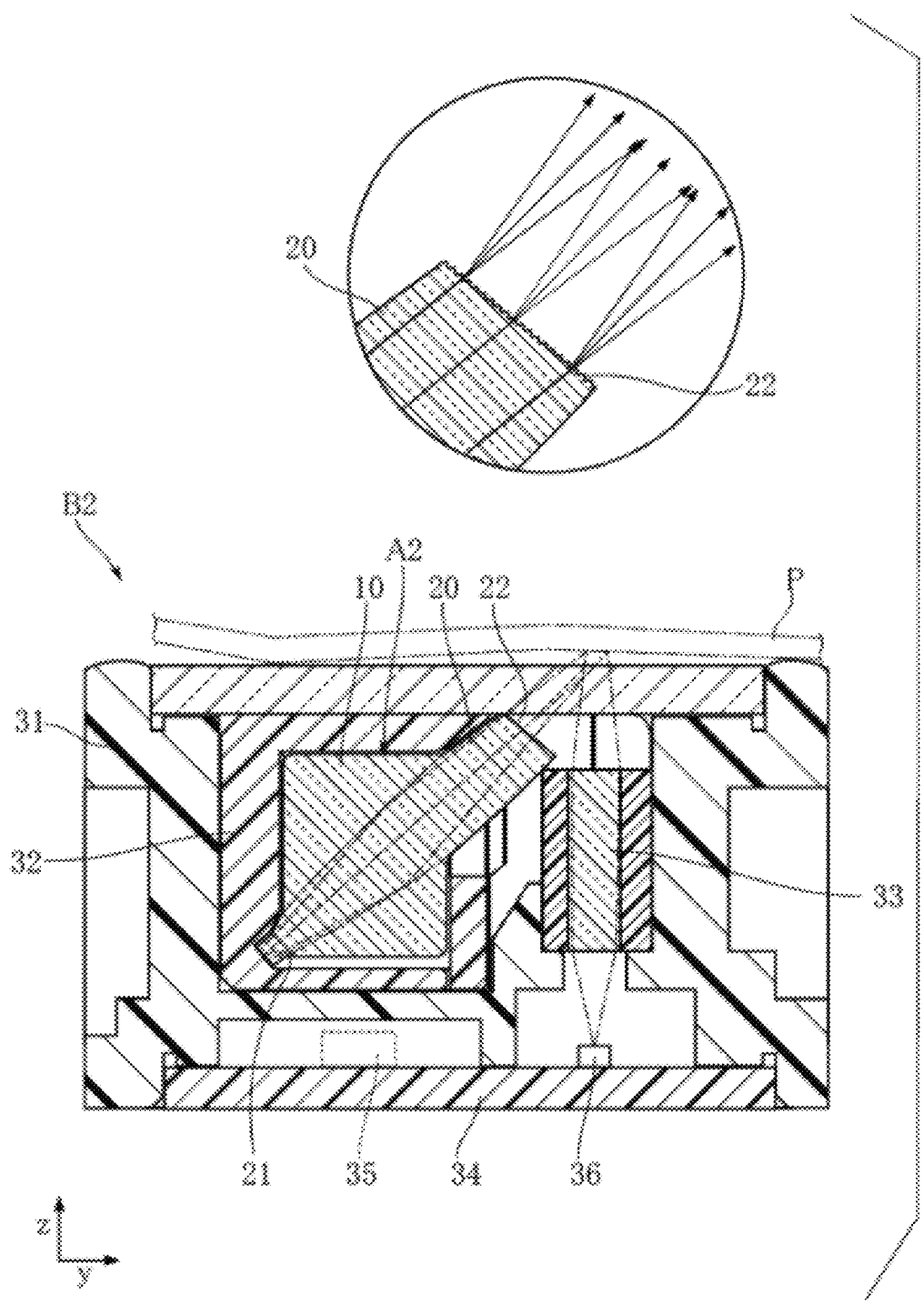
FIG. 7 is a sectional view taken along lines VII-VII in FIG. 5.
Figure 8:
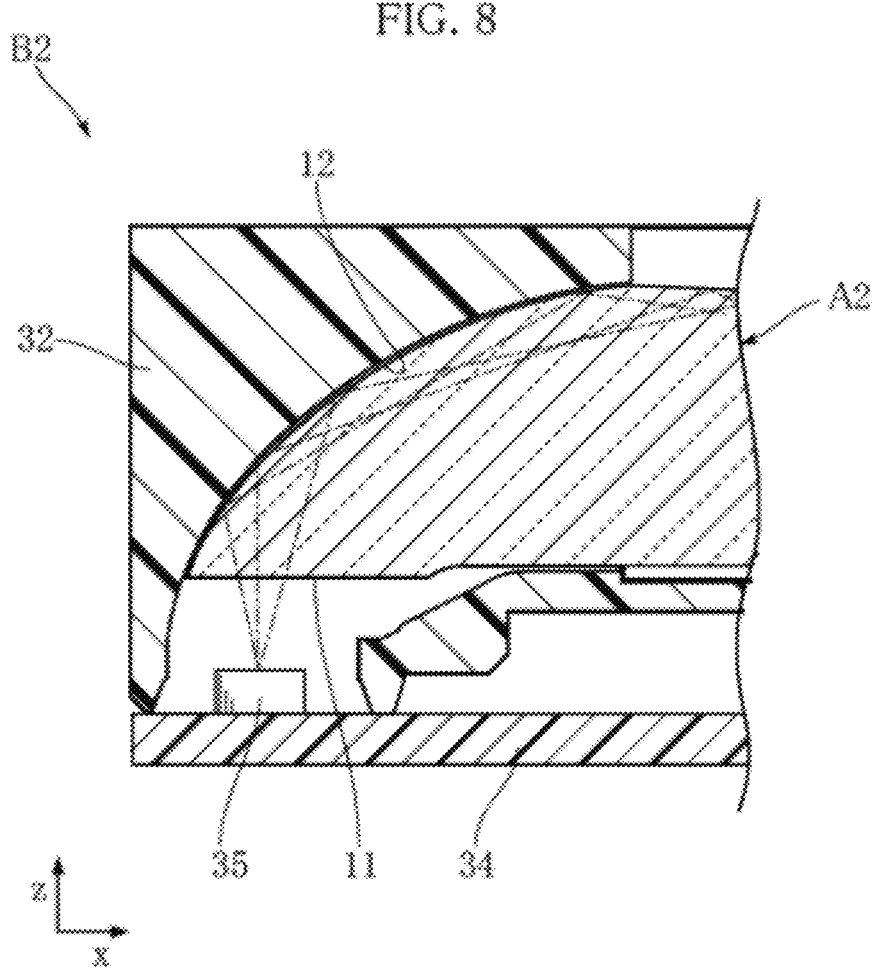
FIG. 8 is a sectional view taken along lines in FIG. 5.

FIG. 5 shows a second embodiment of the light guide according to the present invention. FIGS. 6-8 show a second embodiment of the image reader according to the present invention, which utilizes the light guide A2. The image reader B2 of this embodiment includes the light guide A2, a case 31, a reflector 32, a lens unit 33, a substrate 34, an LED module 35 and a light receiver 36. The image reader B2 has a reading width of about 100 mm and is designed for use in a bill discriminating apparatus.

The case 31 accommodates the light guide A2, the reflector 32, the lens unit 33, the substrate 34, the LED module 35 and the light receiver 36 and is generally in the form of a rectangular parallelepiped including a hollow portion and extending in the direction x. For instance, the case 31 is made of a black resin.

The reflector 32 prevents the light traveling within the light guide A2 from leaking and is made of e.g. white resin. As shown in FIG. 7, the reflector 32 surrounds the light guide A2.

The light guide A2 is made of a transparent resin such as methyl methacrylate resin (PMMA). The light guide causes the light from the LED module 35 to be emitted as linear light extending in the direction x. As shown in FIG. 5, the light guide A2 is made up of a pyramidal portion 10 and a flat portion 20 and includes a light incident portion 11, an inclined surface 12, a light reflecting portion 21 and a light emitting portion 22. In this embodiment, the pyramidal portion 10 and the flat portion 20 are so arranged that the respective center lines form an angle of about 40°. In this embodiment, the pyramidal portion 10 has dimensions of about 3.8 mm in the direction y, about 4.7 mm in the direction z and about 60 mm in the direction x. The flat portion 20 has a thickness of about 1.7 mm and a height of about 8 mm.

As shown in FIG. 8, the light incident portion 11 is oriented in the direction z and faces the LED module 35. The inclined surface 12 reflects the light entering through the light incident portion 11 to cause the light to travel in the direction x. In this embodiment, the inclined surface 12 has a shape formed by pushing out part of an oval profile. In this embodiment, the light incident portion 11 has a dimension of about 4 mm in the direction x, whereas the inclined surface 12 has a dimension of about 7.3 mm in the direction x.

The light reflecting portion 21 extends in the direction x and is provided at the lower end of the flat portion 20. The light traveling within the light guide A2 in the direction x is reflected by the light reflecting portion 21 toward the light emitting portion 22. In this embodiment, the light reflecting portion 21 includes a plurality of grooves (not shown). The grooves are arranged at equal intervals in the direction x. The size of the groove increases as the distance from the inclined surface 12 increases. For instance, the width of the light reflecting portion 21 is about 0.6 mm.

The light emitting portion 22 extends in the direction x and is provided at the upper end of the flat portion 20. As shown in FIG. 7, the light emitting portion 22 of this embodiment comprises a surface formed with fine irregularities. The surface with fine irregularities scatters the light passing through the surface and constitutes the scatterer of the present invention. For instance, the light guide A2 including the light emitting portion 22 is made by molding using a mold which includes an irregular surface formed by shot blasting. For instance, the width of the light emitting portion 22 is about 1.6 mm.

The lens unit 33 is an optical part for converging the linear light reflected by the object P onto the light receiver 36. For instance, the lens unit 33 includes a plurality of columnar lenses arranged in the direction x and held by a housing made of a resin.

The substrate 34 is made of e.g. a ceramic material or a glass fiber-reinforced epoxy resin. The LED module 35 and the light receiver 36 are mounted on the substrate. The substrate 34 is fitted to the bottom of the case 31 and fixed with a plurality of fittings (not shown).

The LED module 35 is the light source of the image reader B2 and incorporates e.g. LED chips for emitting red light, blue light and green light. The LED module 35 is mounted on the substrate 34 to face the light incident portion 11.

The light receiver 36 is arranged to extend in the direction x and designed to generate an electromotive force corresponding to the amount of light received and output a luminance signal for each pixel from the electromotive force. By receiving the light reflected by the object P to be read by the light receiver 36, the content of the object P is read as image data.

The advantages of the light guide A2 and the image reader B2 will be described below.

According to this embodiment, the linear light emitted from the light emitting portion 22 does not comprise light rays in the same direction but comprises light rays traveling in different directions. Thus, even when the irradiation angle of the linear light varies at or near a crease of the object P to be read, the amount of light converged by the lens unit 33 does not vary. Thus, the object such as a bill, which is often formed with a crease, is read with uniform brightness.

The light emitting portion 22 with a scatterer made of irregularities is advantageous in that the light is scattered relatively uniformly in the longitudinal direction and the width direction of the light guide A2.

Figure 9:
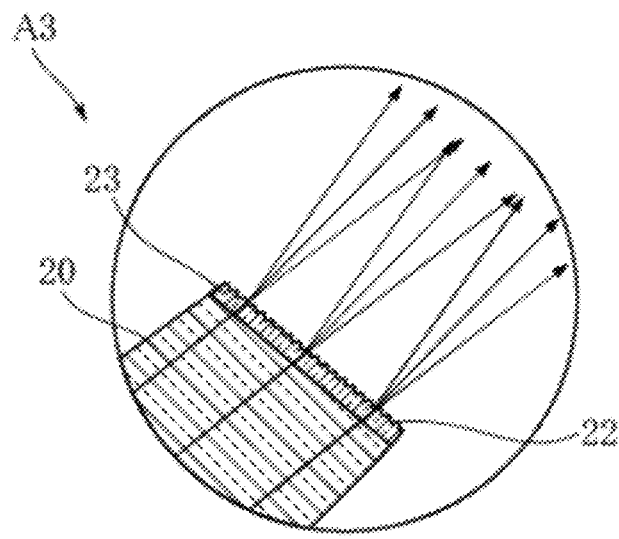
FIG. 9 shows a third embodiment of the light guide according to the present invention.
Figure 10:
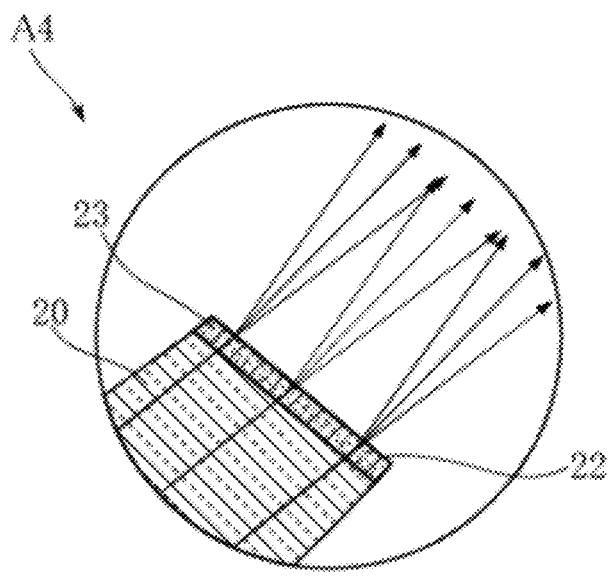
FIG. 10 shows a fourth embodiment of the light guide according to the present invention.

FIGS. 9 and 10 show other examples of the light guide according to the present invention. In these figures, the elements which are identical or similar to those of the foregoing embodiments are designated by the same reference signs as those used for the foregoing embodiments.

FIG. 9 shows a third embodiment of the light guide according to the present invention. Unlike the light guide A2 the light guide A3 of this embodiment includes a scattering sheet 23 as the scatterer. The scattering sheet 23 is in the form of a strip extending in the longitudinal direction of the light guide A3 and bonded to the main body of the light guide A3. The scattering sheet 23 is made of a transparent resin and includes a surface formed with irregularities. With this embodiment again, the object P to be read, which includes a crease, is read with uniform brightness. For instance, a light guide, which does not include a scatterer, may be prepared in advance, and depending on the application of the image reader, a scattering sheet 23 may be bonded to the light guide, whereby the light guide A3 of this embodiment is provided.

FIG. 10 shows a fourth embodiment of the light guide according to the present invention. The light guide A4 of this embodiment differs from the light guide A3 in structure of the scattering sheet 23. The scattering sheet 23 of this embodiment is made of a transparent resin slightly clouded to be milk-white and has a smooth surface. With this embodiment again, the linear light is emitted while scattering, so that the object P to be read, which is formed with a crease, is read uniformly.

FIGS. 11-16 show a third embodiment of the image reader according to the present invention. The image reader B3 of this embodiment includes a light guide A5, a case 31, a reflector 32, a lens unit 33, a substrate 34, an LED module 35, a light receiver 36 and a glass cover 37. The single LED module 35 is mounted on the substrate 34. A plurality of light receivers 36 are mounted on the substrate in a row. The image reader B3 is elongate in the primary scanning direction and designed as a contact-type image reader for reading a document image while transferring the document, which is held in close contact with the glass cover 37, in the secondary scanning direction. The glass cover 37 is the transparent cover of the present invention.

Figure 13:
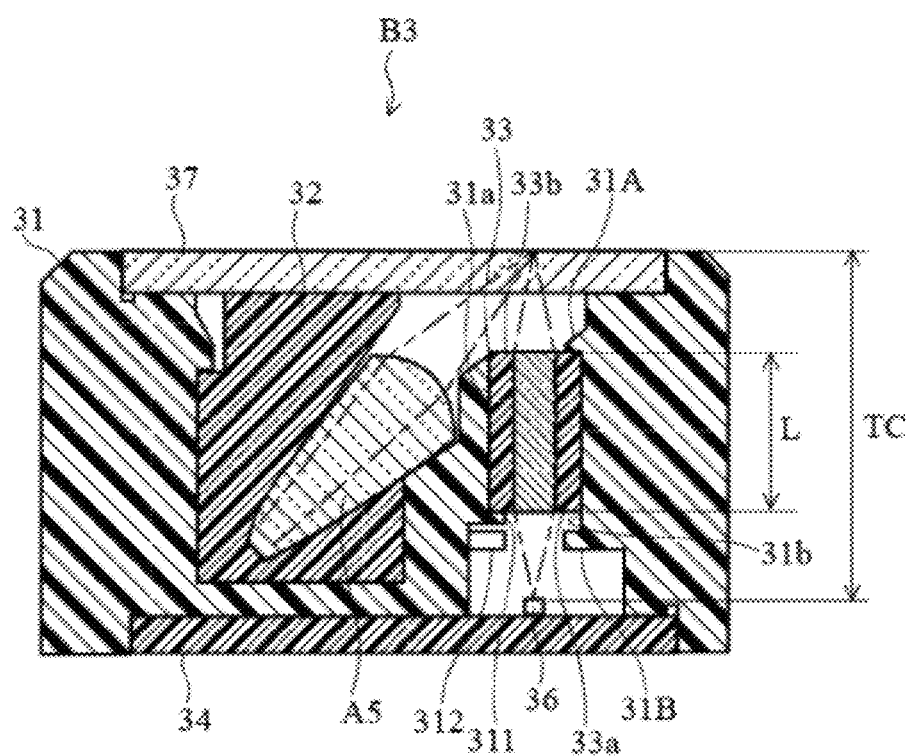
FIG. 13 is a sectional view showing a principal portion of the image reader of FIG. 11.

The case 31 is in the form of an elongated rectangular parallelepiped. The substrate 34 is arranged at the bottom of the case 31. The glass cover 37 is arranged at the top of the case 31. As shown in FIG. 13, the case 31 includes a first side wall 31a and a second side wall 31b, which define a space for arranging the light receiver 36 and the lens unit 33. The case further includes an internal space for arranging the reflector 32 and the light guide A5. The first side will 31a is positioned on a first side of the lens unit 33 to partition the lens unit 33 from the light guide A5. The second side wall 31b is positioned on a second side of the lens unit 33, which is opposite from the first side.

Figure 12:
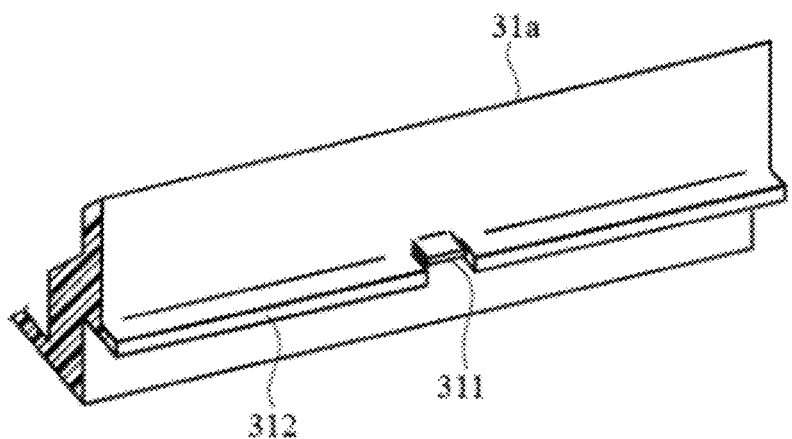
FIG. 12 is a perspective view showing a principal portion of the image reader of FIG. 11.

As shown in FIG. 12, the first side wall 31a is formed with a lens holding portion 311 and a lens stopper portion 312 which project toward the lens unit 33. The lens holding portion 311 elastically holds the light emitting surface 33a of the lens unit 33, which faces the light receiver 36. As shown in FIG. 13, the lens holding portion 311 comprises a projection in the form of a thin strip to be elastically deformed easily upon contact with an edge of the light emitting surface 33a. The lens stopper portion 312 serves to stop the light emitting surface 33a so that the lens unit 33 does not come too close to the light receiver 36. The lens stopper portion is thicker than the lens holding portion 311 and positioned closer to the light receiver 36 than the lens holding portion is. The lens holding portion 311 and the lens stopper portion 312 are formed at different heights.

As shown in FIG. 13, the second side wall 31b is spaced from the first side wall 31a by a predetermined distance so that the lens unit 33 is sandwiched between the first side wall 31a and the second side wall 31b. The second side wall 31b is formed with a lens engaging portion 31A and a lens stopper portion 31B which project toward the lens unit 33. The lens engaging portion 31A elastically engages with the light incident surface 33b of the lens unit 33, which faces the glass cover 37. The lens engaging portion comprises a projection in the form of a thin strip to be elastically deformed easily upon contact with an edge of the light incident surface 33b. The lens stopper portion 31B has the same function as that of the lens stopper portion 312 of the first side wall 31a and is formed at the same height as the lens stopper portion 312. The lens stopper portion 31B and the lens holding portion 311 are formed at different heights. The lens engaging portion 31A and the lens holding portion 311 can be elastically deformed to almost the same degree, whereas the lens stopper portions 312 and 31B cannot be elastically deformed to such a degree. In FIG. 13, the space between the lens engaging portion 31A and the lens holding portion 311 is substantially equal to the axial length L of the lens unit 33, and the lens unit 33 is fixed right in the middle between the glass cover 37 and the light receiver 36.

The substrate 34 is made of e.g. a ceramic material or a glass fiber-reinforced epoxy resin. The LED module 35 and the light receiver 36 are mounted on the substrate. The substrate 34 is fitted to the bottom of the case 31, with the LED module 35 and the light receiver 36 oriented toward the inside of the case 31.

The LED module 35 is mounted at an end of the substrate 34. The light emitted from the LED module 35 becomes incident on a predetermined position of the glass cover 37 via the light guide A5.

The light receiver 36 comprises e.g. a CCD or CMOS photosensor and generates an electromotive force corresponding to the amount of light received and outputs a luminance signal for each pixel from the electromotive force. The light from the predetermined position of the glass cover 37 is guided to the light receiver 36 via the lens unit 33, whereby the image of the document (not shown) held in close contact with the glass cover 37 is read.

The lens unit 33 is an optical part for guiding the light reflected by the document to the light receiver 36. The lens unit 33 includes a plurality of rod lenses arranged in the longitudinal direction of the case 31 and held by a housing made of a resin. The lens unit 33 forms a non-magnified erect image of the document image on the light receiver 36. Thus, the distance from the glass cover 37 to the light receiver 36 is set to a predetermined dimension as the conjugate distance TC.

Figure 11:
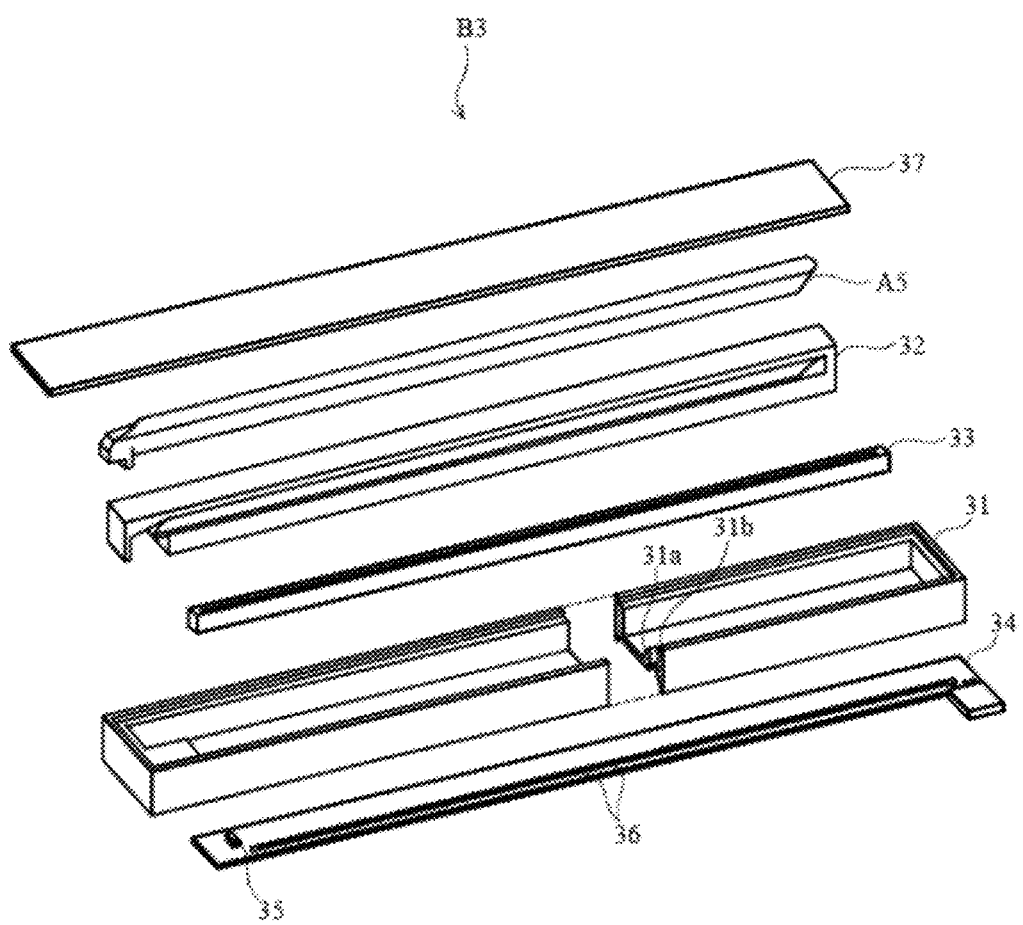
FIG. 11 is an exploded perspective view showing a third embodiment of the image reader according to the present invention.

The reflector 32 prevents the light guided by the light guide A5 from leaking and is made of e.g. white resin. As shown in FIG. 11, the reflector 32 extends in the longitudinal direction of the case 31 and is incorporated in the case 31. The reflector 32 surrounds the light guide A5.

The light guide A5 is made of a transparent resin and causes the light from the LED module 35 to be emitted as linear light extending in the longitudinal direction. The light guide A5 is surrounded by the reflector 32 and arranged in the case 31.

The fixing of the lens unit 33 will be described below.

Figure 14:
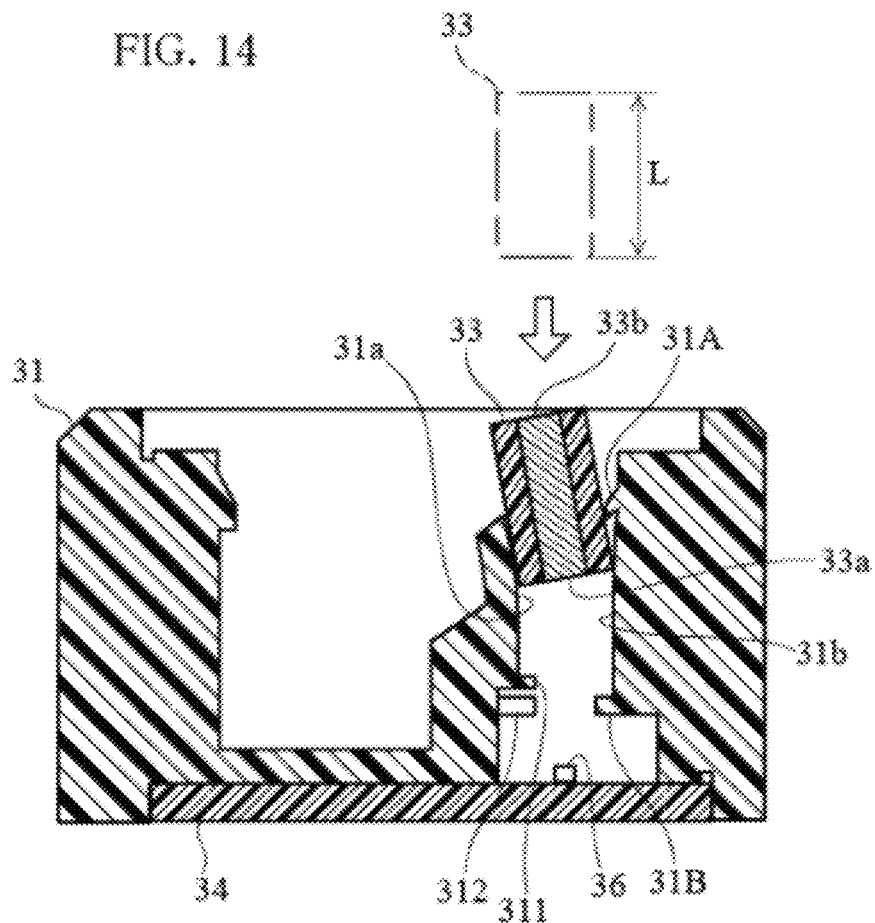
FIG. 14 is a sectional view showing the operation of the image reader of FIG. 11.

As shown in FIG. 14, the lens unit 33 having the axial length L is inserted between the first side wall 31a and the second side wall 31b while elastically deforming the lens engaging portion 31A.

Figure 15:
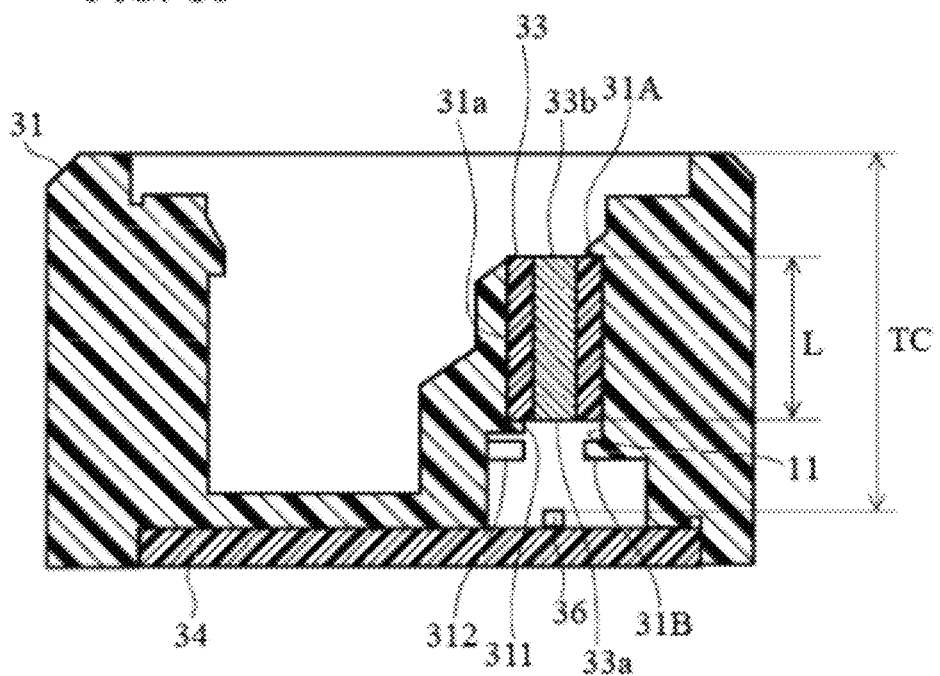
FIG. 15 is a sectional view showing the operation of the image reader of FIG. 11.
Figure 16:
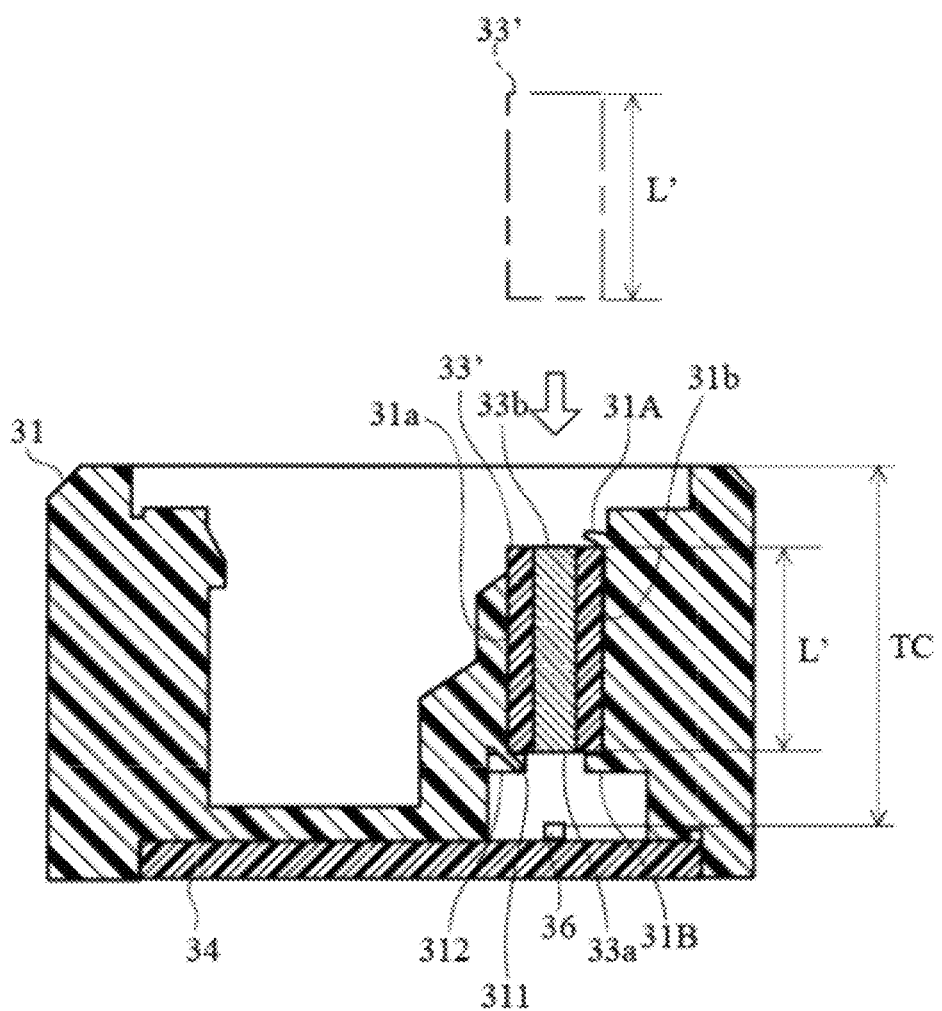
FIG. 16 is a sectional view showing the operation of the image reader of FIG. 11.

When the lens unit inserted is pushed with the edge of the light emitting surface 33a held in contact with the lens holding portion 311, the lens engaging portion 31A returns to its original posture due to the elastic restoring force. As a result, as shown in FIG. 15, the lens engaging portion engages with the edge of the light incident surface 33b. Thus, the lens unit 33 is fixedly held between the lens holding portion 311 and the lens engaging portion 31A, i.e., at the middle position of the conjugate distance TC.

Next, the instance in which a lens unit 33' having the axial length L' is used is considered. Although the lens unit 33' is designed for the same conjugate distance TC as that of the lens unit 33, the axial length L' is longer than the axial length L. The lens unit 33' is inserted between the first side wall 31a and the second side wall 31b while elastically deforming the lens engaging portion 31A.

By further inserting the lens unit 33', the edge of the light emitting surface 33a of the lens unit 33' elastically deforms the lens holding portion 311 toward the light receiver 36 and comes into contact with the lens stopping portions 312 and 31B to stop at the position. The lens engaging portion 31A returns to its original posture due to the elastic restoring force but is raised slightly upward due to the contact with the edge of the light incident surface 33b. In this state, the lens holding portion 311 and the lens engaging portion 31A apply the same degree of elastic restoring force to the lens unit 33', whereby the lens unit 33' is held at the middle between these portions. Thus, the lens unit 33' having a relatively long axial length L' is also fixedly held at the middle position of the conjugate distance TC. Similarly, a lens unit of a different axial length can be held at the middle position of the conjugate distance TC as long as the axial length is in the range of L to L'.

In this way, the image reader B3 of this embodiment ensures that lens units 33 and 33' having different axial lengths of L and L' are properly held at the middle position of the conjugate distance TC. Thus, a non-magnified erect image of the image of the document held in close contact with the glass cover 37 is properly formed on the light receiver 36 regardless of which of the lens units 33, 33' is employed. Thus, the resolution is enhanced.

It is to be noted that the first side wall may be provided with a lens holding portion only, and the lens stopper portion may not be provided.

Figure 17:
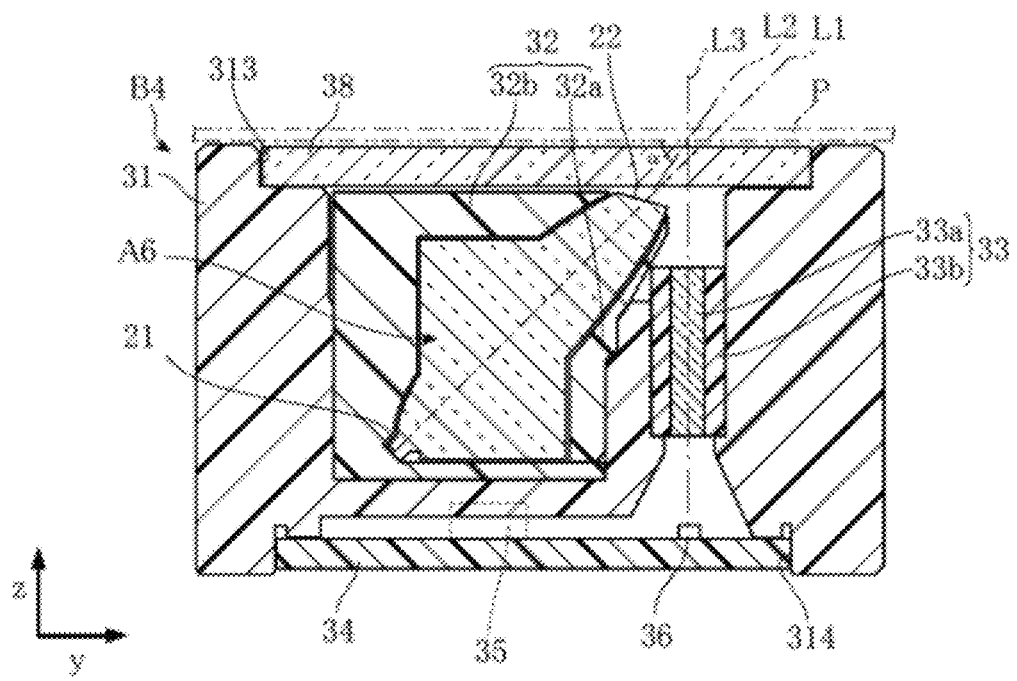
FIG. 17 is a sectional view showing a fourth embodiment of the image reader according to the present invention.

FIG. 17 shows a fourth embodiment of the image reader according to the present invention. The image reader B4 shown in FIG. 17 includes a light guide A6, a case 31, a reflector 32, a lens unit 33, a substrate 34, an LED module 35, a light receiver 36 and a glass cover 37. In FIG. 17, the direction which is perpendicular to the sheet surface is the primary scanning direction of the image reader B4. The direction y is the secondary scanning direction, and the direction z is perpendicular to the direction y. In FIG. 17, the object P to be read, which comprises a sheet having a predetermined thickness in the direction z and extending in the direction y, is indicated by phantom lines. The image reader B4 performs reading by directing linear light to the object P at the portion directly above the light receiver 36 in the direction y while moving the object P in the direction y.

The substrate 34 is made of e.g. a ceramic material and in the form of an elongated plate extending in the primary scanning direction of the image reader B4 and having a width in the direction y and a thickness in the direction z. The substrate 34 is formed with a non-illustrated wiring pattern. The light receiver 36 is mounted at an end of the substrate 34 in the direction y. The LED module 35 is mounted on the substrate 34 at an end in the primary scanning direction. The LED module 35 incorporates e.g. LED chips for emitting red light, blue light and green light and emits light toward the light guide A6.

The case 31 accommodates the substrate 34, the light guide A6, the reflector 32 and the lens unit 33 and is generally in the form of a rectangular parallelepiped extending in the primary scanning direction. The lens unit 33 is arranged in the case 31 at a position deviated toward an end of the case in the direction y. The light guide A6 and the reflector 32 are arranged in the case 31 between the lens unit 33 and the other end of the case in the direction y. The case 31 includes an opening 313 at an upper portion in the direction z and an opening 319 at a lower portion in the direction z. The glass cover 38 is fitted in the opening 313, whereas the substrate 34 is fitted in the opening 314. The case 31 is made of e.g. black resin.

Figure 18:
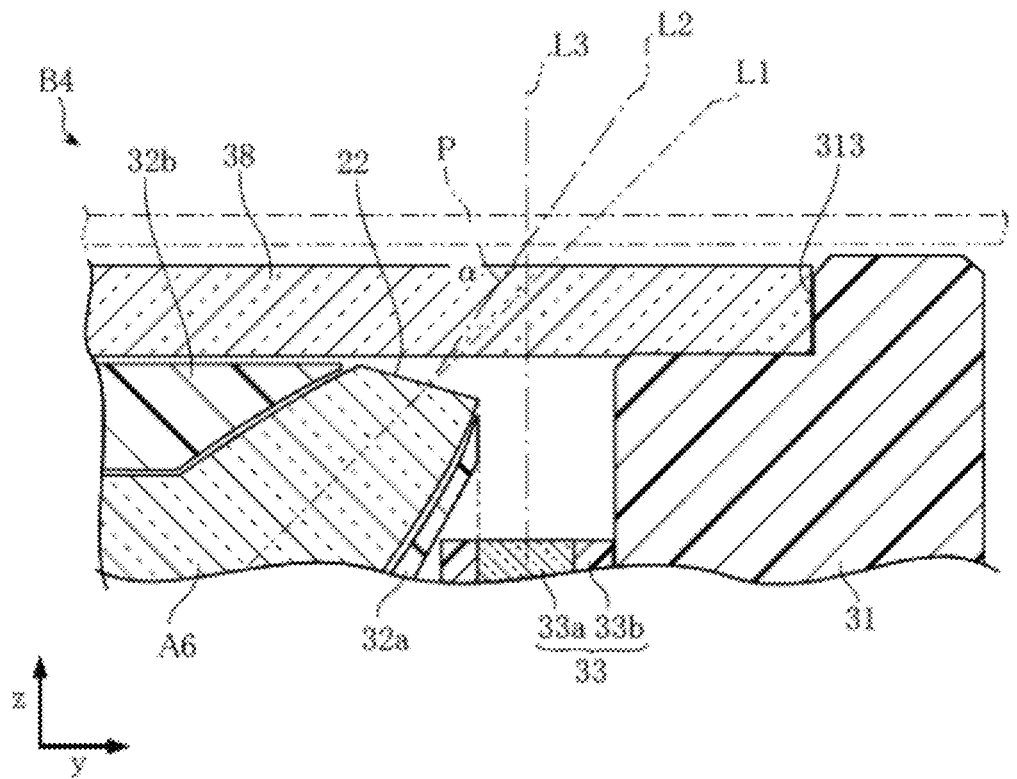
FIG. 18 is an enlarged view showing a principal portion of the image reader of FIG. 17.

The light guide A6 is made of a transparent resin such as methyl methacrylate resin (PMMA). The light guide causes the light from the LED module 35 to be emitted toward the object P as linear light extending in the primary scanning direction. The light guide A6 includes a light emitting portion 22 for emitting linear light, and a light reflecting portion 21 for reflecting the diffusing light traveling in the light guide A6 along the optical axis L1. The light reflecting portion 21 is inclined 45° with respect to the direction y. The optical axis L1 extends in the normal direction of the light reflecting portion 21 and is inclined 45° with respect to the direction y. The light emitting portion 22 is positioned on the opposite side of the light reflecting portion 21 in the direction along the optical axis L1. The light reflected by the light reflecting portion 21 travels toward the light emitting portion 22. The light emitting portion 22 is inclined with respect to the direction y at an angle smaller than 45°. Thus, the linear light is emitted from the light emitting portion 22 along an optical axis L2, which is deviated from the optical axis L1. For instance, the optical axis L2 is inclined at an angle of $\alpha$ (=55)° with respect to the direction y. The portion around the light emitting portion 22 is shown in FIG. 18 as enlarged. The light guide A6 may include a scatterer like those described above with respect to the light guide A1, A2, A3, A4.

The reflector 32 is made of e.g. white resin and fitted to a predetermined portion in the case 31. The reflector 32 surrounds the light guide 31 to prevent the light traveling within the light guide 31 from leaking. The reflector 32 is made up of a reflector 32a and a reflector 32b.

The reflector 32a covers one side surface of the light guide A6 in the direction x. As shown in FIG. 18, one end of the reflector 32a in the direction x extends up to an end of the light guide A6. The reflector 32b covers portions of the light guide A6, which, are not covered by the reflector 32a. The light emitting portion 22 is exposed.

The lens unit 33 includes, a lens member 33a for converging the linear light reflected by the object P onto the light receiver 36, and a lens holder 33b holding the lens member 33a. The lens member 33a comprises e.g. a plurality of columnar lenses arranged inn the primary scanning direction. The lens holder 33b comprises e.g. a housing made of a resin and holds the lens member 33a by sandwiching in the direction y. As shown in FIG. 18, the position of an end of the lens member 33a in the direction y corresponds to the position of an end of the light guide A6 and reflector 32 in the direction y.

The light receiver 36 is arranged on the substrate 34 to extend in the primary scanning direction and constitutes the light receiver according to the present invention. The light receiver 36 generates an electromotive force corresponding to the amount of light received and outputs a luminance signal for each pixel obtained from the electromotive force to the outside via the wiring pattern on the substrate 34 and a non-illustrated connector. By receiving the light reflected by the object P to be read by the light receiver 36, the content of the object P is read as image data.

The glass cover 37 protects the interior of the case 31. The object P to be read is placed on the glass cover to be movable in the direction y.

The advantages of the image reader B4 will be described below.

According to this embodiment, the light emitting portion 22 and the lens member 33a are arranged adjacent to each other the direction y, and the angle formed by the linear light emitted from the light emitting portion 22 and the object P to be read is larger than that in a conventional structure. As the angle formed by the object P and the linear light impinging on the object P comes closer to 90°, the shade formed on the object P becomes smaller. Thus, the shade formed by the linear light emitted from the light emitting portion 22 is smaller than that in the conventional structure. Thus, with the image reader B4, the influence of a wrinkle or crease of the object P is relatively small, so that proper image reading is ensured.

Figure 19:
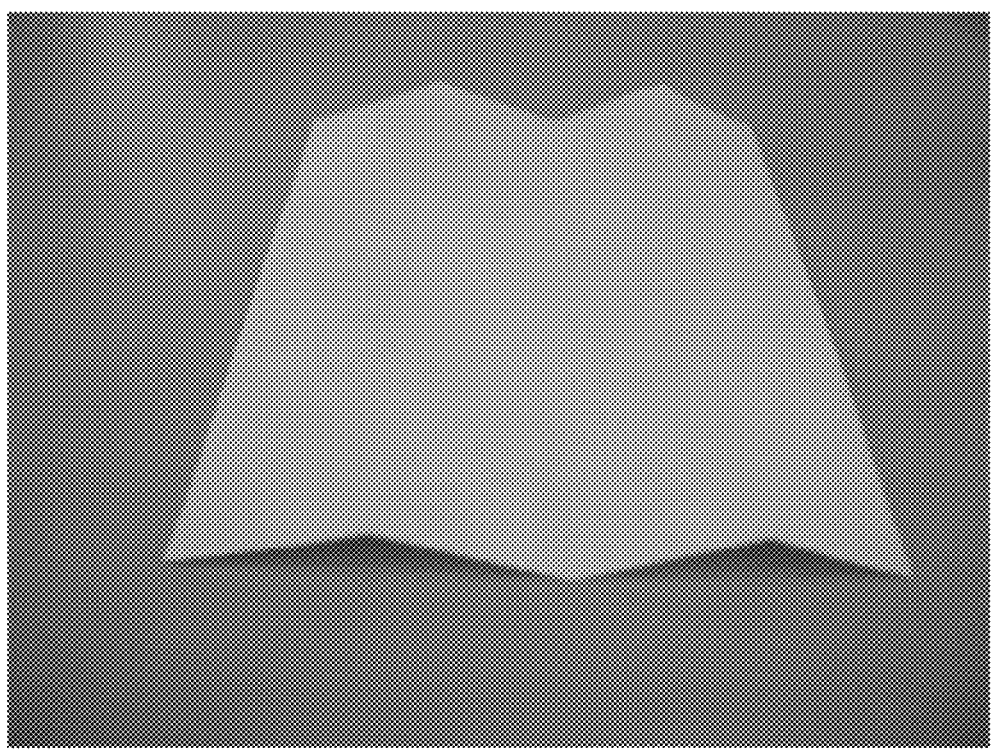
FIG. 19 shows an example of object to be read that has a crease.
Figure 20:
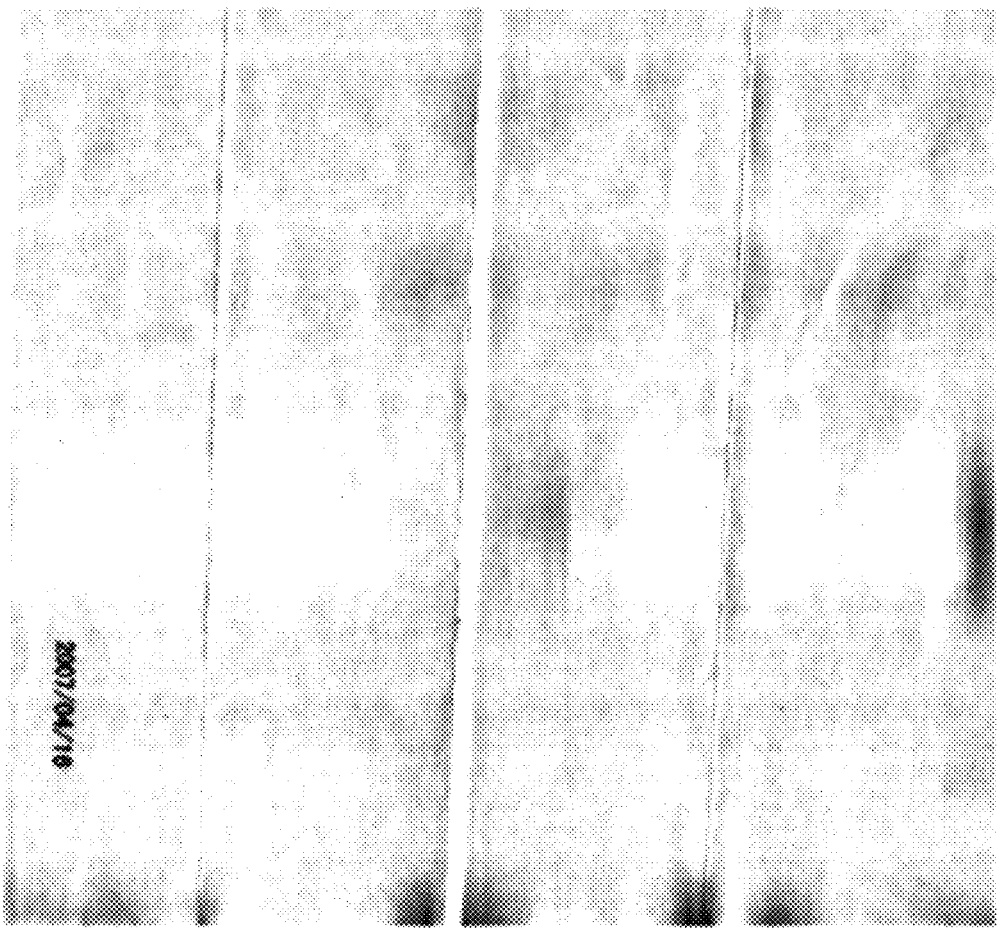
FIG. 20 shows an example of image obtained by the image reader of FIG. 17.
Figure 21:
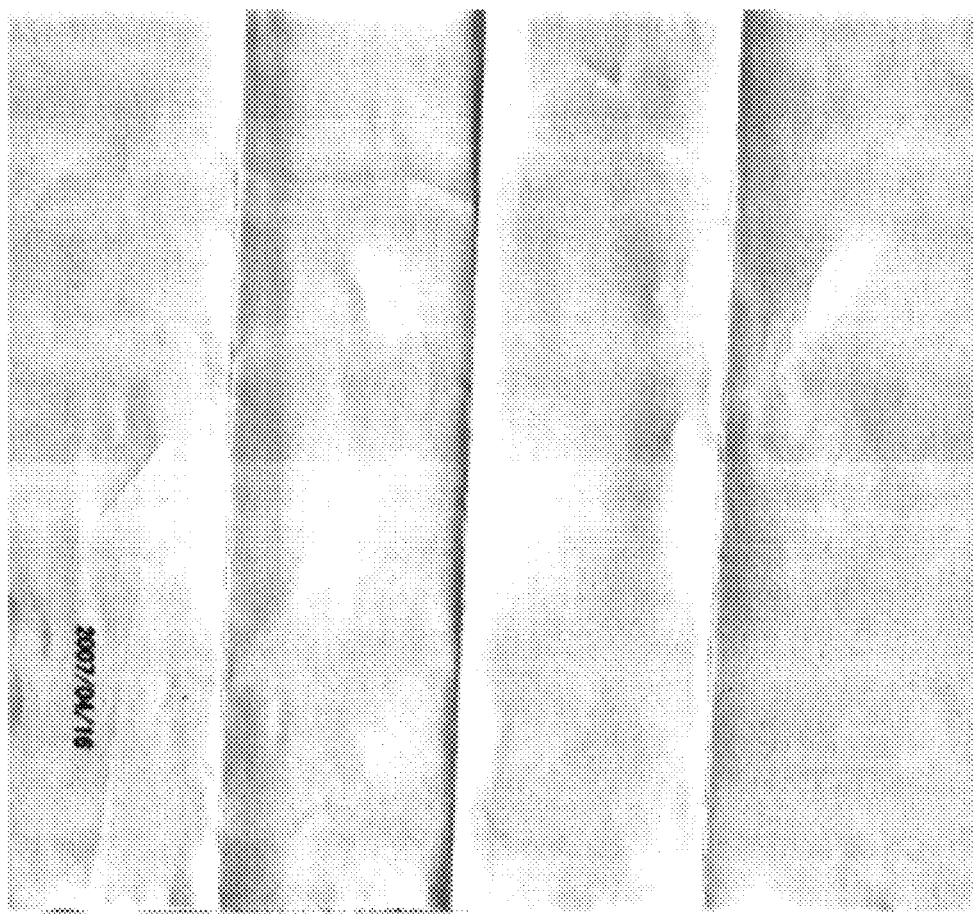
FIG. 21 shows an example of image obtained by conventional image reader.

FIG. 19 shows an example of object P to be read, which includes creases formed intentionally. FIG. 20 shows an image obtained by reading the object P of FIG. 19 using the image reader B4. FIG. 21 shows an image obtained by reading the object P of FIG. 19 using a conventional image reader X for comparison.

By comparing the images of FIGS. 20 and 21, it is found that the image of FIG. 20 includes less shade than the image of FIG. 21. This fact indicates that the image reader B4 is less influenced by a wrinkle or crease on the surface of the object P and performs image reading more properly.

The image reader according to the present invention is not limited to the foregoing embodiments. The specific structure of each part of the image reader according to the present invention may be varied in design in many ways. For instance, an end of the light guide A6 and an end of the reflector 32a may not be aligned in the direction y. Further, the end of the light guide A6 in the direction y may be located at any position between the end of the lens member 33a and the end of the lens holder 33b.

FIG. 22 is a sectional view showing a fifth embodiment of the image reader according to the present invention. The image reader A5 shown in FIG. 22 includes a light guide A7, a case 31, a reflector 32, a lens unit 33, a substrate 34, an LED module 35, a light receiver 36 and a glass cover 37. In FIG. 22, the direction which is perpendicular to the sheet surface is the primary scanning direction of the image reader B5. The direction y is the secondary scanning direction, and the direction z is perpendicular to the direction y. In FIG. 22, the object P to be read, which is a sheet having a predetermined thickness in the direction z and extending in the direction y, is indicated by phantom lines. The image reader B4 performs reading by directing linear light to the object P at the portion directly above the light receiver 36 in the direction y while moving the object P in the direction y.

The substrate 34 is made of e.g. a ceramic material and in the form of an elongated plate extending in the primary scanning direction of the image reader B4 and having a width in the direction y and a thickness in the direction z. The substrate 34 is formed with a non-illustrated wiring pattern. The light receiver 36 is mounted at an end of the substrate 34 in the direction y. The LED module 35 is mounted on the substrate 34 at an end in the primary scanning direction. The LED module 35 incorporates e.g. LED chips for emitting red light, blue light and green light and emits light toward the light guide A6.

The case 31 accommodates the substrate 34, the light guide A6, the reflector 32 and the lens unit 33 and is generally in the form of a rectangular parallelepiped extending in the primary scanning direction. The case 31 includes a first side wall 31a and a second side wall 31b which are provided at a position deviated toward an end of the case in the direction y and spaced from each other. The lens unit 33 is arranged between the first side wall 31a and the second side wall 31b. The light guide A6 and the reflector 32 are arranged in the case 31 between the lens unit 33 and the other end of the case in the direction y. The case 31 includes an opening 313 at an upper portion in the direction z and an opening 314 at a lower portion in the direction z. The glass cover 38 is fitted in the opening 313, whereas the substrate 34 is fitted in the opening 214. The case 31 is made of e.g. black resin.

The first side wall 31a is formed with a lens holding portion 311 and a lens stopper portion 312 which project toward the lens unit 33. The lens holding portion 311 elastically holds the light emitting surface 33a of the lens unit 33, which faces the light receiver 36. The lens holding portion 311 comprises a projection in the form of a thin strip to be elastically deformed easily upon contact with an edge of the light emitting surface 33a. The lens stopper portion 312 serves to stop the light emitting surface 33a so that the lens unit 33 does not come too close to the light receiver 36. The lens stopper portion is thicker than the lens holding portion 311 and positioned closer to the light receiver 36 than the lens holding portion is. The lens holding portion 311 and the lens stopper portion 312 are formed at different heights.

The second side wall 31b is formed with a lens engaging portion 31A and a lens stopper portion 31B which project toward the lens unit 33. The lens engaging portion 31A elastically engages with the light incident surface 33b of the lens unit 33, which faces the glass cover 37. The lens engaging portion comprises a projection in the form of a thin strip to be elastically deformed easily upon contact with an edge of the light incident surface 33a. The lens stopper portion 31B has the same function as that of the lens stopper portion 312 of the first side wall 31a and is formed at the same height as the lens stopper portion 312. The lens stopper portion 31B and the lens holding portion 311 are formed at different heights. The lens engaging portion 31A and the lens holding portion 311 can be elastically deformed to almost the same degree, whereas the lens stopper portions 312 and 31B cannot be elastically deformed to such a degree.

The light guide A7 is made of a transparent resin such as methyl methacrylate resin (PMMA). The light guide causes the light from the LED module 35 to be emitted toward the object P as linear light extending in the primary scanning direction. The light guide A6 includes a light emitting portion 22 for emitting linear light, and a light reflecting portion 21 for reflecting the diffusing light traveling in the light guide A6 along the optical axis L1. The light reflecting portion 21 is inclined 45° with respect to the direction y. The optical axis L1 extends in the normal direction of the light reflecting portion 21 and is inclined 45° with respect to the direction y. The light emitting portion 22 is positioned on the opposite side of the light reflecting portion 21 in the direction along the optical axis L1. The light reflected by the light reflecting portion 21 travels toward the light emitting portion 22. The light emitting portion 22 is inclined with respect to the direction y at an angle smaller than 45°. Thus, the linear light is emitted from the light emitting portion 22 along an optical axis L2, which is deviated from the optical axis L1. For instance, the optical axis L2 is inclined at an angle of α (=55°) with respect to the direction y.

In the light guide A7, a scattering sheet 23, which is in the form of a strip extending in the longitudinal direction of the light guide A7, is bonded to the light emitting portion 22. The scattering sheet 23 is made of a transparent resin and includes a surface formed with irregularities.

FIG. 23 is a sectional view along the optical axis L1 of the light guide A7. As shown in FIG. 23, the light reflecting portion 21 includes a plurality of recesses 21a spaced from each other in the longitudinal direction. The light reflecting portion 21 is further formed with a plurality of grained portions 211 each having a predetermined length in the longitudinal direction. The grained portions 211 include grains formed by e.g. blasting using beads of 50 to 150 μm. Since the grained portions 211 include projections and recesses of the grains, a larger amount of light is reflected at the grained portions as compared with the state before the grains are formed. In the light guide A1, by the provision of the grained portions 211, the amount of light to be emitted from the light emitting portion 22 is increased partially.

The reflector 32 is made of e.g. white resin and fitted to a predetermined portion in the case 31. The reflector 32 surrounds the light guide 31 to prevent the light traveling within the light guide 31 from leaking. The reflector 32 is made up of a reflector 32a and a reflector 32b.

The reflector 32a covers one side surface of the light guide A7 in the direction x. As shown in FIG. 18, one end of the reflector 32a in the direction x extends up to an end of the light guide A6. The reflector 32b covers portions of the light guide A7 which are not covered by the reflector 32a. The light emitting portion 22 is exposed.

The lens unit 33 includes a lens member 33a for converging the linear light reflected by the object P onto the light receiver 36, and a lens holder 33b holding the lens member 33a. The lens member 33a comprises e.g. a plurality of columnar lenses arranged in the primary scanning direction. The lens holder 33b comprises e.g. a housing made of a resin and holds the lens member 33a by sandwiching in the direction y. As shown in FIG. 22, the position of an end of the lens member 33a in the direction y corresponds to the position of an end of the light guide A6 and reflector 32 in the direction y.

The light receiver 36 is arranged on the substrate 34 to extend in the primary scanning direction and constitutes the light receiver according to the present invention. The light receiver generates an electromotive force corresponding to the amount of light received and outputs a luminance signal for each pixel obtained from the electromotive force to the outside via the wiring pattern on the substrate 34 and a non-illustrated connector. By receiving the light reflected by the object P to be read by the light receiver 36, the content of the object P is read as image data.

The glass cover 37 protects the interior of the case 31. The object P to be read is placed on the glass cover to be movable in the direction y.

The advantages of the image reader B5 will be described below.

According to this embodiment, similarly to the light guide A1, the grained portions 211 are formed in the light guide A7 at the regions of the light reflecting portion 21 at which the amount of light reflected is relatively small. Thus, the light guide A7 emits linear light which is uniform in the longitudinal direction. Moreover, in this embodiment, the work to improve the grained portions 211 is further performed to make the light reflected at the grained portions 211 further uniform in the longitudinal direction. This work enhances the uniformity of the linear light emitted from the light guide A1. The image reader B5, which incorporates the light guide A7 capable of emitting uniform linear light, reads the object P properly.

Moreover, similarly to the light guide A3, the light guide A7 of this embodiment is capable of reading the object P, which includes a crease, with uniform brightness. In this embodiment again, a scatterer similar to that of the light guide A2 or A4 may be provided at the light emitting portion 21. With this arrangement, the image reader B5 properly reads the object P.

Similarly to the image reader B3, the image reader according to this embodiment is capable of holding lens units 33 of different lengths in the direction Z. Thus, even when the length of the lens unit 33 in the direction z changes, a non-magnified erect image of the image of the document held in close contact with the glass cover 37 is formed on the light receiver 36, so that the resolution is enhanced.

According to this embodiment, similarly to the image reader B4, the light emitting portion 22 and the lens member 33a are arranged adjacent to each other in the direction y, and the angle formed by the linear light emitted from the light emitting portion 22 and the object P to be read is larger than that in a conventional structure. As the angle formed by the object P and the linear light impinging on the object P comes closer to 90°, the shade formed on the object P becomes smaller. Thus, the shade formed by the linear light emitted from the light emitting portion 22 is smaller than that in the conventional structure. Thus, with the image reader B4, the influence of a wrinkle or crease of the object P is relatively small, so that proper image reading is ensured.

The light guide and image reader according to the present invention are not limited to the foregoing embodiments. The specific structure of each part of the light guide and image reader according to the present invention may be varied in design in many ways.

For instance, in the light guide A1, the grained portion 211 may be formed throughout the entire length of the light reflecting portion 21, and the linear light along the longitudinal direction may be made uniform by adjusting the depths of the grains.

The size of the grains formed by the above-described blasting using beads of 50 to 150 μm is suitable for a light guide for guiding visible light. Thus, to form a light guide for guiding infrared or ultraviolet light, it is preferable to form grains using beads which are smaller or larger than the above.

Although grains are formed by blasting in the foregoing embodiments, the grains may be formed by etching.

Similarly to the light guide A1, the light guides A2, A3 and A4 may also be provided with recesses 21a and grained portion 211 at the light reflecting portion 21.

The invention claimed is:
1. An image reader, comprising:
an elongated light guide, the light guide comprising:
a light incident portion provided at an end in a longitudinal direction;
a light reflecting portion extending in the longitudinal direction;
a light emitting portion extending in the longitudinal direction for emitting linear light; and a scatterer, the scatterer being provided at the light emitting portion to scatter light entered through the light incident portion and pass light traveling from the light reflecting portion;
  a light source facing the light incident portion;
  a light receiver for receiving light reflected by an object to be read; and
  a lens unit for focusing the light reflected by the object onto the light receive;
  wherein at least a part of the light guide overlaps the lens unit as viewed along an optical axis of the lens unit.

2. The image reader according to claim 1, wherein the scatterer comprises surface irregularities provided at the light emitting portion.

3. The image reader according to claim 1, wherein the scatterer comprises a scattering sheet bonded to the light emitting portion.

4. The image reader according to claim 1, further comprising a grained portion formed at at least part of the reflecting portion.

5. The image reader according to claim 1, wherein the light reflecting portion includes a plurality of recesses arranged in the longitudinal direction.

6. The image reader according to claim 1, wherein the lens unit includes: a plurality of columnar lenses arranged in the longitudinal direction of the light guide; and a resin housing for holding the plurality of columnar lenses.

* * * * *